Sept. 20, 1971 R. E. BUSBY 3,606,210
ENGINE MOUNTING FOR VTOL AIRCRAFT AND THE LIKE
Filed Nov. 6, 1969 4 Sheets-Sheet 1

INVENTOR
RALPH E. BUSBY
BY
ATTORNEYS

Sept. 20, 1971  R. E. BUSBY  3,606,210
ENGINE MOUNTING FOR VTOL AIRCRAFT AND THE LIKE
Filed Nov. 6, 1969  4 Sheets-Sheet 2

INVENTOR
RALPH E. BUSBY
BY
ATTORNEYS

Sept. 20, 1971    R. E. BUSBY    3,606,210
ENGINE MOUNTING FOR VTOL AIRCRAFT AND THE LIKE
Filed Nov. 6, 1969    4 Sheets-Sheet 3

INVENTOR
RALPH E. BUSBY
BY
ATTORNEYS

Sept. 20, 1971  R. E. BUSBY  3,606,210
ENGINE MOUNTING FOR VTOL AIRCRAFT AND THE LIKE
Filed Nov. 6, 1969  4 Sheets-Sheet 4

INVENTOR
RALPH E. BUSBY
BY
ATTORNEYS

United States Patent Office 3,606,210
Patented Sept. 20, 1971

3,606,210
ENGINE MOUNTING FOR VTOL AIRCRAFT AND THE LIKE
Ralph E. Busby, 1620 9th St., Greeley, Colo. 80631
Filed Nov. 6, 1969, Ser. No. 874,519
Int. Cl. B64d 27/06
U.S. Cl. 244—12A                                    6 Claims

ABSTRACT OF THE DISCLOSURE

An engine mounting for aircraft capable of horizontal and vertical flight comprises a cylindrical base pivotally mounted on a horizontal longitudinal axis and having a portion constituting a continuation of the surface of the airfoil. An engine, preferably of the jet propulsion type, is mounted on a laterally extending housing projecting from the cylindrical base and provided with a ring bearing affording 180° of rotation of the engine in a plane parallel to the axis of the base whereby the engine may be positioned to direct its thrust forwardly, upwardly or in reverse and may be inclined from the vertical to either side when in its upward thrust position to produce a lateral thrust component. The engine pod structure is rotated by turning it on a shaft which intersects the axis of the base and passes through the base. A universal joint in the shaft affords bending of the shaft at the pivotal axis of the base. The lateral housing and bearing ring preferably have diameters of the order of that of the engine pod.

---

This invention relates to aircraft of the type capable of both vertical and horizontal flight and particularly to an improved mounting for facilitating the adjustment of the position and direction of thrust of the engines on such aircraft.

Aircraft have been provided heretofore which are capable of both horizontal and vertical flight and various arrangements have been provided or disclosed for adjusting the direction of thrust of the propulsion units of such aircraft. The adjustment of the direction of the thrust of the propulsion units has been suggested for controlling the pitch, roll and yaw of the aircraft, particularly during vertical flight and during hovering. It is important that effective controls be provided for maintaining or changing the attitude of an aircraft capable of vertical flight and hovering, and that such controls be reliable and smooth in operation. Accordingly, it is an object of the present invention to provide an improved attitude control mounting for aircraft capable of both horizontal and vertical flight.

It is another object of this invention to provide an improved power unit mounting for aircraft capable of both horizontal and vertical flight.

It is another object of this invention to provide an improved adjustable engine mounting for aircraft which shall have minimum affect on the desired aerodynamic characteristics of the aircraft.

Briefly, in carrying out the objects of this invention in one embodiment thereof, an aircraft having four engines is provided with engine mountings, each of which comprise a pivotal base or supporting cylinder mounted on a horizontal axis along the side of the aircraft structure. The cylinder has an exposed wall portion constituting a continuation of the surface of the adjacent airfoil or body surface. The cylinder may be pivoted at least to a limited extent about its horizontal axis and the engine is mounted in a lateral extension from the cylinder and moves with the cylinder. The lateral extension comprises a housing the walls of which are part of the aircraft surface. A slip ring or ring bearing is provided in the extension in a plane parallel to the axis of the cylinder and is constructed to allow the engine to be rotated through about 180° to afford positioning of the engine to direct its thrust either forward, backward or vertically downward. Angular positioning of the engine is effected by rotation of a hollow shaft secured to the engine and intersecting the axis of the cylinder. A universal joint in the shaft adjacent the axis of the cylinder affords bending of the shaft to accommodate pivotal movement of the engine about the cylinder axis. The engines may thus be positioned to provide thrust for horizontal and vertical flight and for braking; furthermore, the engines may be adjusted to change the attitude of the aircraft during hovering, and may be employed to turn the aircraft about a vertical axis while it is hovering in a relatively fixed position.

The features of novelty which characterize this invention are pointed out with particularity in the claims annexed to and forming a part of this specification. The invention itself, however, both as to its organization and method of operation, together with further objects and advantages thereof, will be best understood upon reference to the following description taken in connection with the accompanying drawings in which;

Figure 1:
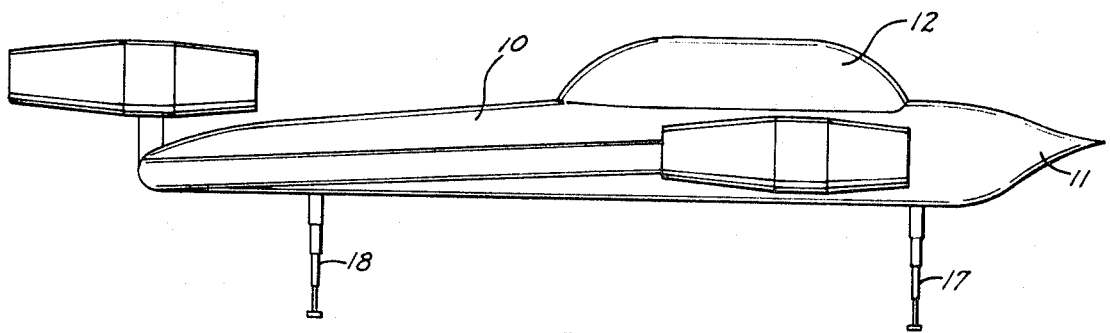
FIG. 1 is a side elevation view of an aircraft of the VTOL type provided with an engine mounting embodying the invention.
Figure 2:
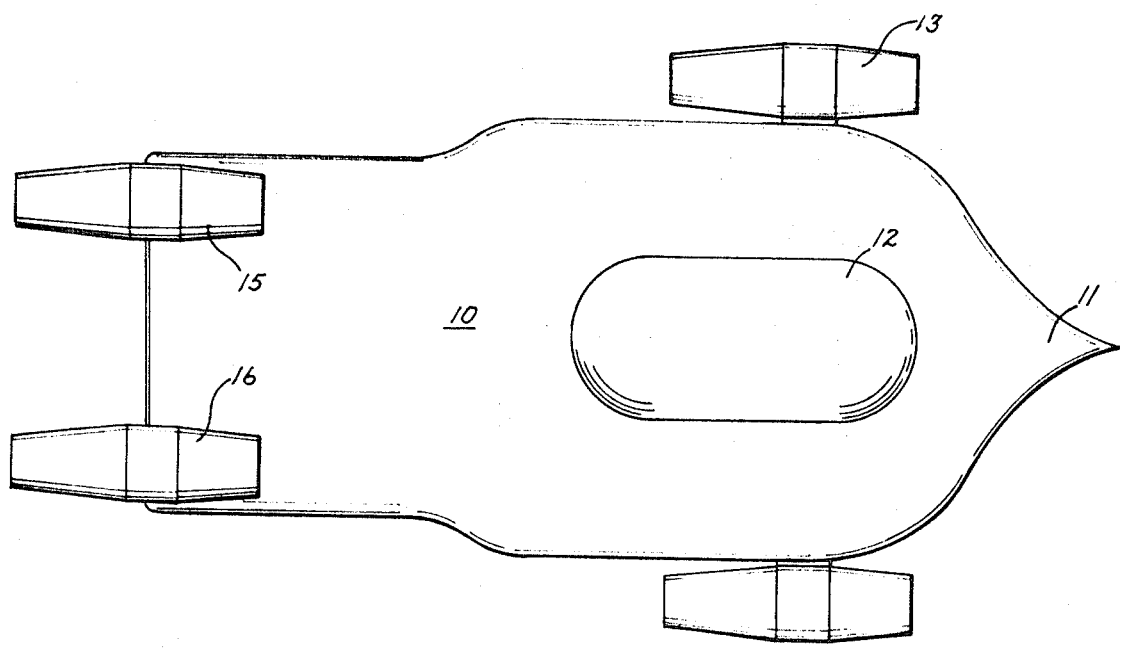
FIG. 2 is a top plan view of the aircraft of FIG. 1.
Figure 3:
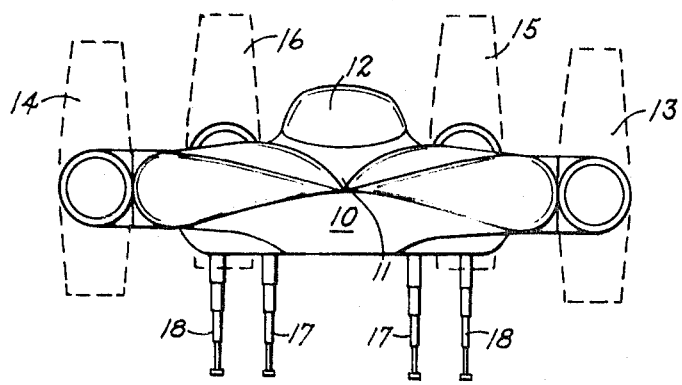
FIG. 3 is a front elevation view of the aircraft of FIG. 1.

Referring now to the drawings, FIGS. 1, 2 and 3 illustrate an aircraft of the vertical take off and landing type it being capable of both vertical and horizontal flight. The aircraft comprises a body 10 of an elongated somewhat rectangular configuration and having its forward end 11 pointed and streamlined to provide the desired aerodynamic characteristics during horizontal flight. A central compartment is provided for the pilot and passengers and is covered by a transparent bubble 12. A pair of forward jet engines 13 and 14 are provided and a pair of aft or rear engines 15 and 16 are mounted at the tail or aft section of the aircraft.

When on the ground the aircraft is supported by pairs of front and rear stands or legs 17 and 18, respectively, which are constructed to be telescoped for retraction into the body of the aircraft. These legs 17 and 18 have been illustrated as provided with feet or pads for engagement with the ground.

Figure 4:
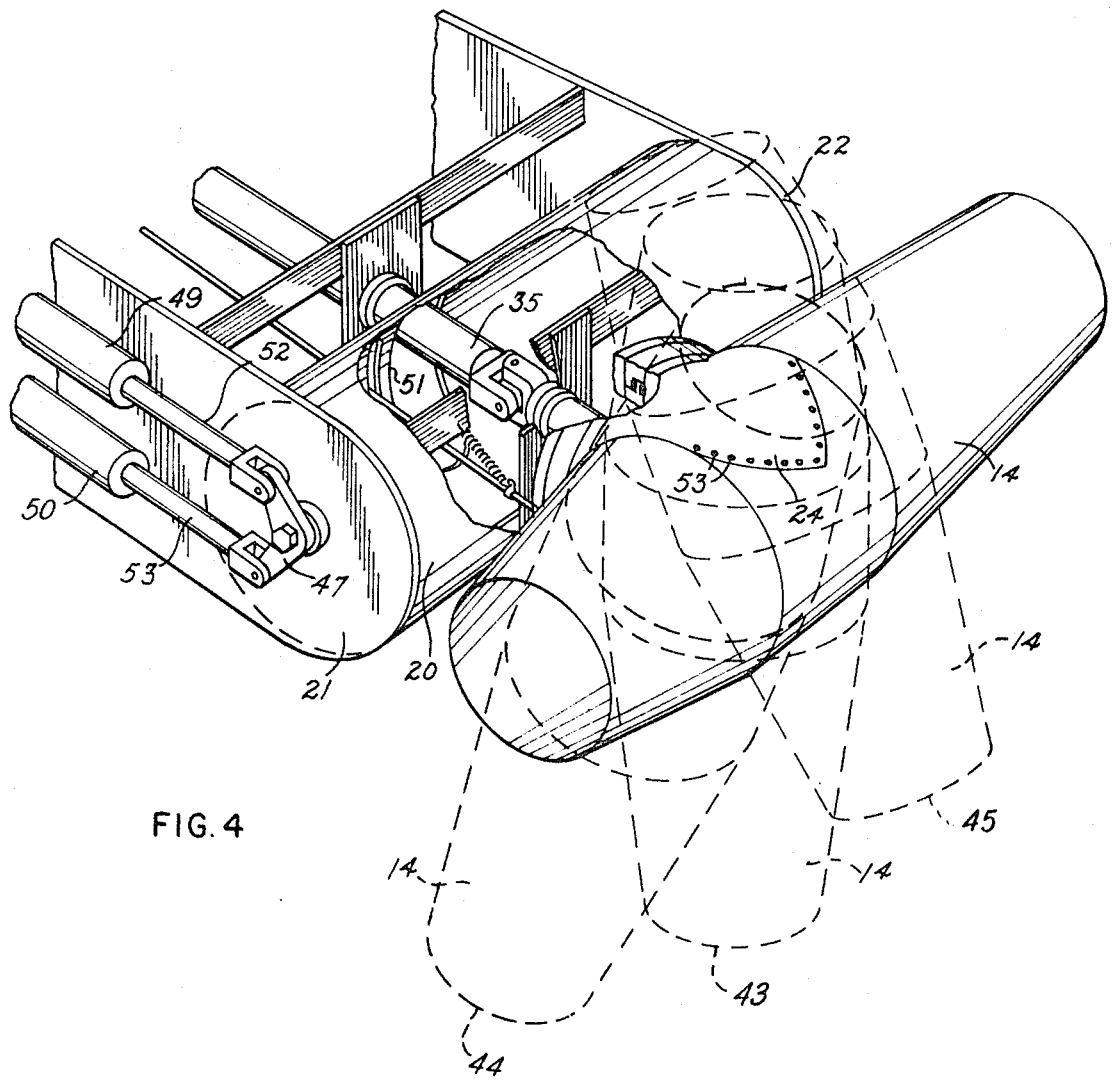
FIG. 4 is an enlarged perspective view, partly broken away, illustrating the mounting of one of the forward engines of the aircraft of FIG. 1.
Figure 5:
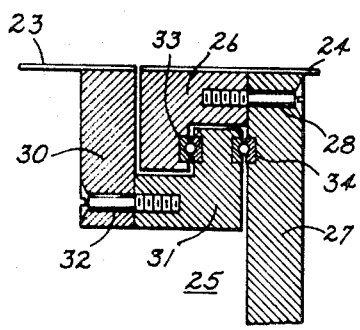
FIG. 5 is an enlarged sectional view of the ring bearing of the mounting of FIG. 4.

The engines 13, 14, 15 and 16 are provided with mountings embodying the invention and which makes it possible to turn the engines so that they move into positions 180° from those shown to act as brakes and may also be rotated into vertical positions with their thrust downwardly as indicated by dotted lines in FIG. 3. In a manner to be described below, these engines also may be tilted laterally to provide lateral thrust when they are in their generally vertical positions and thereby make it possible to control lateral movement of the aircraft when it is moving vertically or hovering. This lateral adjustment of the engines may also be employed to turn the aircraft about a vertical axis in the course of vertical movement or hovering. The construction and arrangement of the mounting assembly for the forward engines is illustrated in FIG. 4 which shows the engine 14 mounted on a cylindrical base 20 which is rotatably mounted on the airframe structure between two structural members 21 and 22, the outer portion of the cylindrical surface of the base 20 constitutes a continuation of the surface of the body 10 and forms a part of that surface. The engine 14 is mounted on the cylinder 20 by a generally cylindrical connecting housing which, as more clearly shown in FIGS. 6 and 7, comprises a cylindrical portion 23 secured to the cylindrical base member 20 and a cylindrical portion 24 in which the engine 14 is securely mounted; the two portions 23 and 24 are rotatably secured to one another by a radial or ring bearing assembly 25, a cross section of which is shown in FIG. 5. This ring bearing assembly comprises an inwardly facing rigid ring 26 detachably secured to a plate 27 mounted in the portion 24, suitable bolts 28 being provided to connect these members. The cylindrical member 23 is provided with an inwardly extending ring 30 having detachably secured thereto a ring 31 of angle shaped cross section which fits as a complementary member within the ring 26 in spaced relationship. The ring 31 is detachably secured to the ring 30 by suitable machine screws or the like indicated at 32. Ball bearings are employed and are mounted in annular ball bearing assemblies 33 and 34 between the ring 31 and the rings 26 and 27, respectively. This ring bearing assembly thus affords rotation of the engine 14 about the axis of the bearing assembly.

In order to effect rotation of the engine 14 from within the aircraft, a hollow shaft 35 is provided within the body of the aircraft and extends at right angles to the central axis of the cylinder 20, the shaft 35 being provided with suitable bearings, one of which, as is indicated at 36, is mounted in a brace 37 in the supporting structure. A hollow stub shaft or sleeve 38 is rigidly secured to the plate 27 and slidably connected to a shaft 38' by a reduced and splined section 39 of the shaft 38'. The shaft 38' is rotatable in a bearing 40 mounted in a supporting structure 41 within the cylindrical base member 20, the shaft assembly comprising the shaft 38 and 38' is thus rigidly secured in a central position within the cylindrical housing member comprising sections 23 and 24. The two shafts 35 and 38' are connected by a universal joint 42 which allows the shaft 38 to move within an angular range of, say, 30° with respect to the shaft 35, thus the shaft 38 may be swung upwardly for about 15° and downwardly for about 15° thereby changing the position of the engine with respect to the body of the aircraft.

Figure 6:
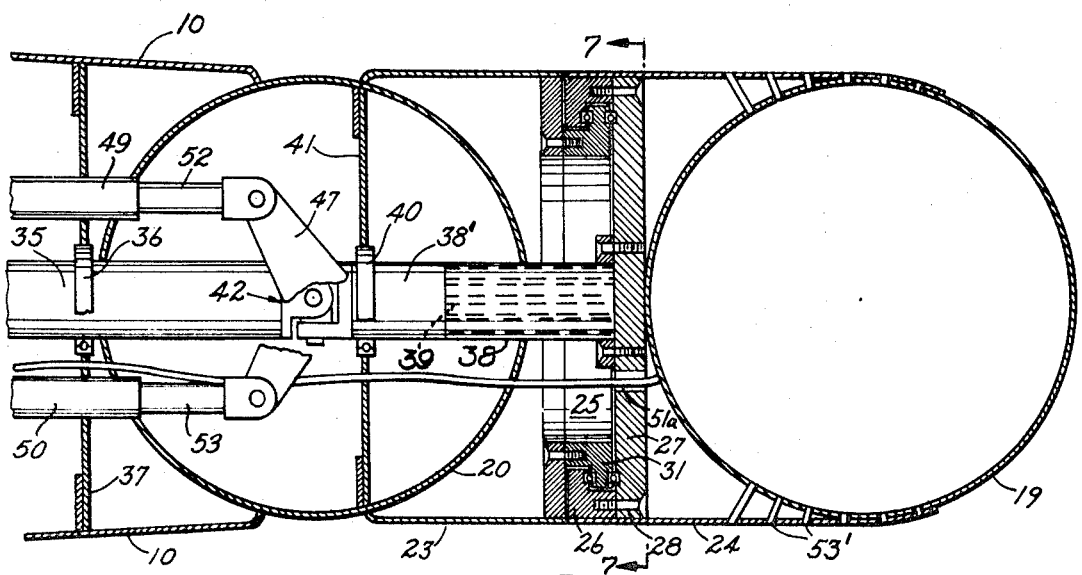
FIG. 6 is an enlarged side elevation view partly in section partly broken away of the engine mounting of FIG. 4.
Figure 7:
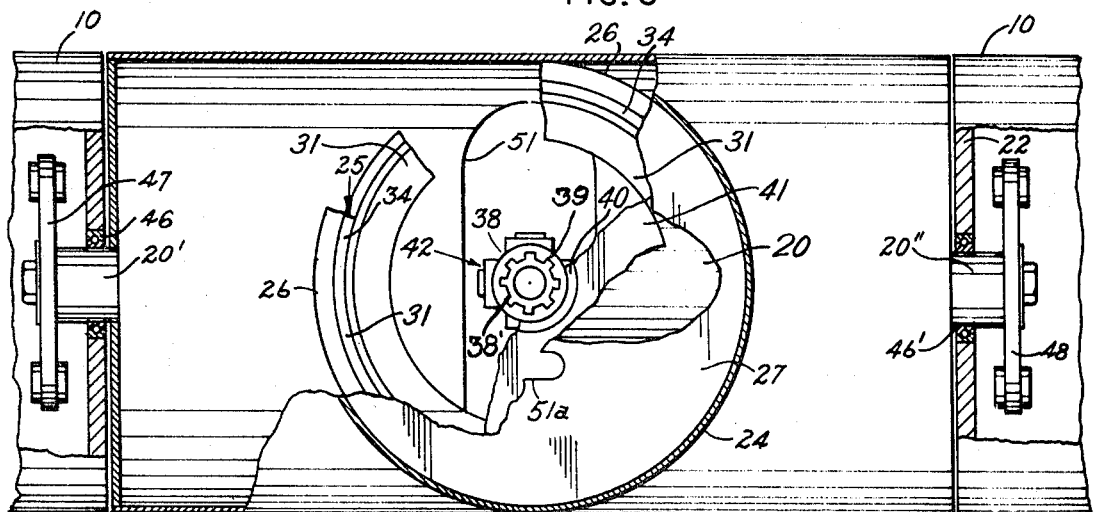
FIG. 7 is a sectional front elevation view of the unit taken along the line 7—7 of FIG. 6 and with the housing and other structural partly broken away to show the interior.

In FIG. 4 the engine 14 is shown in full lines in its forward or driving position for effecting horizontal flight of the aircraft. Tilting of the engine is effected by turning the cylinder base 20 about its axis and when the engine is in its vertical or upward thrust position indicated by dotted lines 43, the two extreme lateral thrust positions are indicated at 44 and 45 by dotted lines to the left and right respectively of the dotted line position 43. In order to afford this tilting operation of the engine 14, the cylinder 20 is mounted between the supporting plates 21 and 22 on stub shafts 20' and 20" mounted in ball bearings 45 and 46, respectively, in the plates 21 and 22, applied through hydraulic cylinders to rock bell cranks 47 and 48 rigidly mounted on the stub shafts 20' and 20", respectively. The hydraulic cylinders for rotating the bell crank 47 are shown in FIGS. 4 and 6 and include an upper cylinder 50 and a lower cylinder 51 having piston rods 52 and 53, respectively, pivotally connected to the upper and lower ends of the bell crank 47. The bell crank 48 is driven by a similar pair of cylinders not shown in the drawing. It will be understood that when the cylinder 50 is moving forward the cylinder 51 is moving back and that these two cylinders are supplied with hydraulic fluid to effect movement in either direction depending upon the desired position of the cylindrical base 20. Flexible fuel and electrical supply lines pass from the interior of the aircraft through suitable openings in the supporting plate 37 and into the cylinder 20 through an elongated opening 51 in the wall of the cylinder 20 thence through the cylinder through suitable openings in the supporting plate 41 and through an opening 51a in the plate 27 and thence into the engine housing, suitable detachable couplings being provided as required. The body 10 of the aircraft at the top and bottom of the cylindrical base 20 is shaped to receive the portions of the cylindrical housing 23 at the top and bottom of the assembly when the engine is tilted upwardly and downwardly respectively. The large diameter of the connecting cylindrical housing comprising sections 23 and 24 provides a smooth outer contour between the cylinder 20 and the engine 14 by also providing a large diameter supporting bearing ring assembly for carrying the motor load. The cylindrical section 24 of the connecting housing is also shaped to the contour of the engine 14 and is rigidly bolted to the engine housing by bolts, those in the upper portion of the section 24 being indicated at 53 as shown in FIG. 4. These bolts are also shown in FIG. 6. This construction provides a simple and rugged engine mounting having good aerodynamic characteristics and which affords positioning of the engine for any of its required thrust positions such as indicated in FIG. 4. The universal joint 42 between the shafts 36 and 38' is designed to afford a required rotation of the shaft for tilting the engine when in its upright position and these shafts mounted in their bearings also provide additional supporting structure for the engine.

The engine mounting assembly described above when operating in its upward thrust position is controlled to vary its lateral angle by rotating the cylinder 20 to a degree determined by the amount of lateral thrust desired. The position of the aircraft may readily be adjusted during its vertical flight and during hovering by tilting the engines to change the direction of the thrust. It will also be apparent that during vertical flight and hovering the engine may be turned on the axis of the shaft 38 rotating this shaft in order to secure forward or rearward components of thrust and by opposite directional positions of the engines 13 and 14 torque may be applied to the aircraft for turning about a vertical axis during flight and during hovering.

Figure 8:
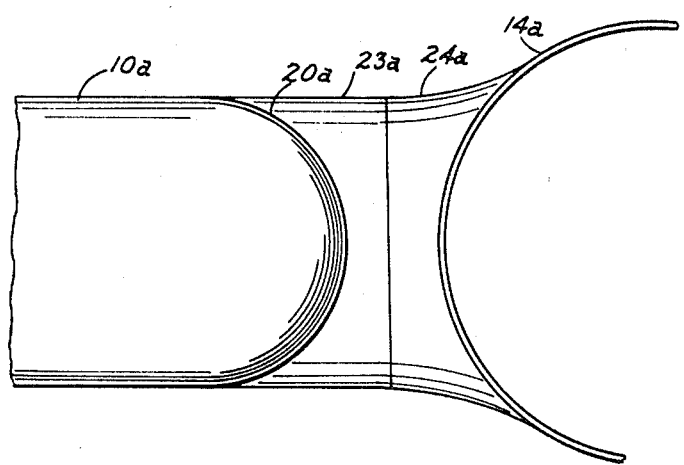
FIG. 8 is a partial front elevation view of a modified configuration of the motor mounting.

For some applications of the engine mounting of this invention, it may be desirable to provide the interconnecting cylindrical mounting of a size different from the diameter of either the cylinder base 20 or of the engine and the configuration of this type of housing connection is indicated somewhat diagrammatically in FIG. 8 in which corresponding parts of the housing structure have been designated by the same numerals as applied to the first embodiment with the suffix letter "a." As illustrated in FIG. 8, the connecting housing between the cylindrical mounting base 20a and the engine 14a comprises housing portions 23a and 24a of curved tapered cross sections providing a smooth outer surface of the connecting housing with substantially smaller diameter than that of the first embodiment. The internal structure of the embodiment of FIG. 8 is essentially the same as that of the previous embodiment and affords adjustment of the position of the engine 14a to secure engine thrust in a wide range of directions as described in connection with the previous embodiment.

Figure 9:
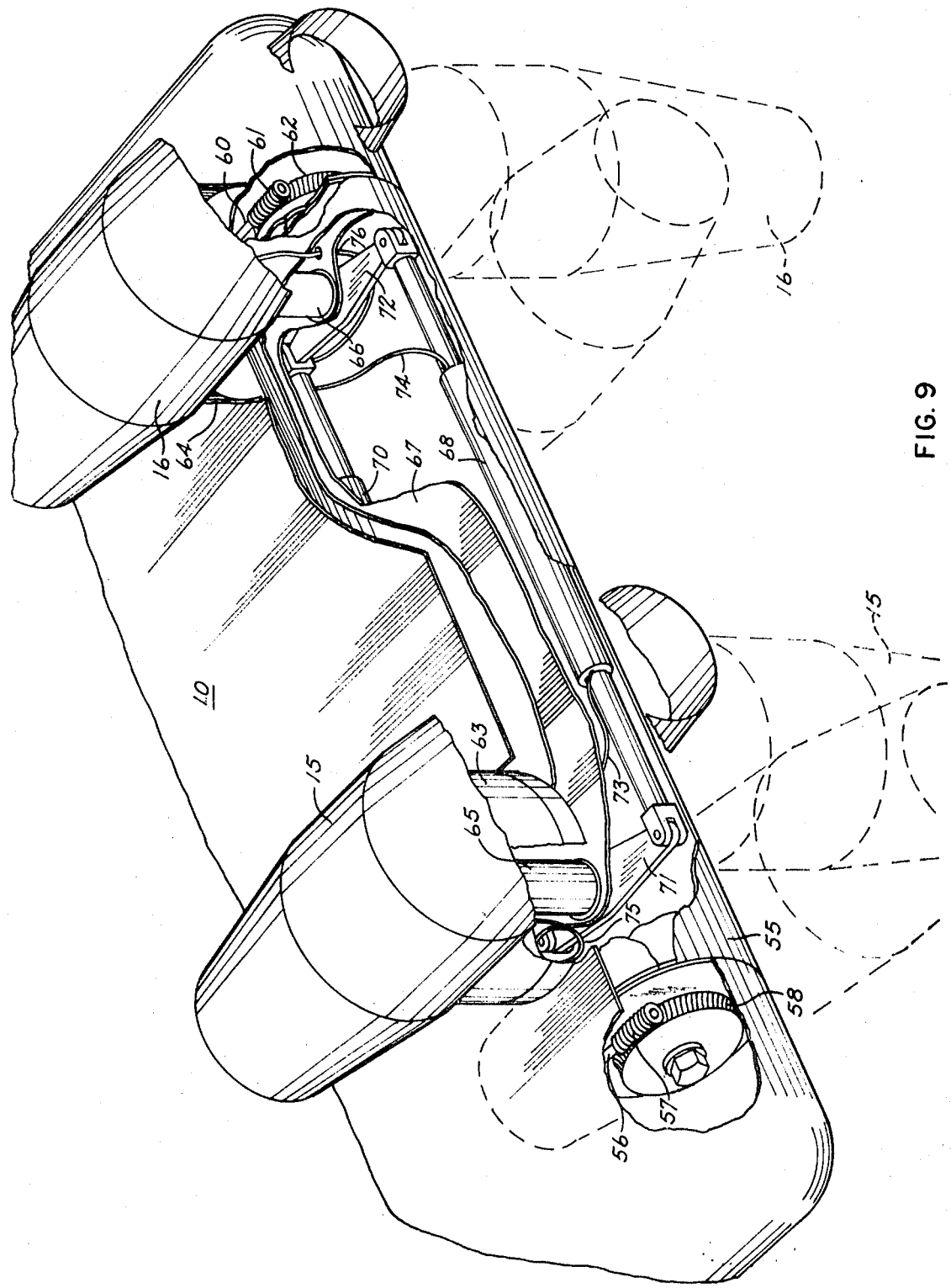
FIG. 9 is a perspective view of the rear engine assembly of the aircraft of FIG. 1 broken away to show internal mounting features.

The structural arrangement for mounting the rear engines 15 and 16 is essentially similar to that employed with forward engines 13 and 14. In the mounting of the rearward engines, however, the arrangement for changing the general direction of the thrust of the engines is effected by rotation of a cylindrical member corresponding to the member 20 of FIG. 4 and the lateral adjustment of the engines to secure lateral thrust is effected by rotation of the central mounting shaft of the engines. The structural features of the mounting assembly of the rear engines are shown in FIG. 9 in which the engines 15 and 16 are shown as mounted in spaced positions on a rotatable base cylinder 55 corresponding to the cylinder 20 of the modification of FIG. 4. The cylinder 55 is mounted for rotation on its central horizontal axis in essentially the same manner as the cylinder 20 of FIG. 4 and is rotated by operation of a suitable electric or hydraulic motor driven shaft 56 having a worm gear 57 engaging a driven gear 58 on the shaft of the cylinder 55. A similar driving arrangement including a shaft 60, worm gear 61 and driven gear 62 are provided at the other end of the cylinder for dual driving of the cylinder. The engines 15 and 16 are mounted on the cylinder 55 by connecting housings 63 and 64 which are the same structural arrangement as the connecting housing of FIG. 4 which comprises the sections 23 and 24 and the bearing ring assembly 25. The engines 15 and 16 may be turned on axes perpendicular to the axis of the cylinder 55 by rotation of stub shafts 65 and 66, respectively, which are rotatably mounted in a supporting plate 67 extending diametrically across the center of the cylinder 55 and carrying hydraulic actuating mechanisms 68 and 70 arranged for operation in opposing directions to rotate bars 71 and 72 rigidly connected to the shafts 65 and 66, respectively. Suitable flexible hydraulic lines, two of which are indicated at 73 and 74 for supplying the hydraulic drive 68, are provided for actuating the drive 68 and 70, flexible fuel lines 75 and 76 are provided for the engines 15 and 16, respectively. It will now be seen that when the engines 15 and 16 are rotated on the cylinder 55 from their driving positions are shown in FIG. 9 to their vertical upward thrust positions, as indicated by dotted lines, lateral thrust may be obtained by rotating the engines the required degree about the shafts 65 and 66. Should an adjustment of forward or rearward thrust be required, this is obtained by rotation of the mounting cylinder 55. It will be understood that where the constructions illustrated in FIG. 9, the two engines 15 and 16 are connected in tandem and move together to secure the same thrust angle on both sides of the aircraft, the longitudinal axes of the engines 15 and 16 being maintained parallel to one another at all times. The braking positions of the engines 15 and 16 is obtained by rotating the cylinder 55 through substantially 180° so that the engines are positioned below the aircraft as indicated by dotted lines in FIG. 9.

The mounting arrangement of this invention wherein the engines are carried by cylindrical portions of the body surface of the aircraft and wherein the ring bearing is provided between the sections of the connecting housing between the aircraft body and the engine housing provides a simple and effective arrangement for controlling or adjusting the positions of thrust of the engine and distributes the load and stresses between the engine and the aircraft over a large circumferential surface in addition to the supporting effect of the engine rotating shafts. The stresses in the mounting assembly are well distributed and the mounting provides streamlined surfaces in all position of the engine which enhance the aerodynamic characteristics of the aircraft. The mountings provide a universal connection between the engine and the aircraft body such that the engine may be moved over a wide range of positions to exert thrust in directions selected in accordance with the desired maneuver of the aircraft.

I claim:

1. In an aircraft capable of both horizontal and vertical flight, an engine mounting and engine position adjusting structure comprising a base member, means for mounting said member adjacent the edge of an aircraft wing for rotary movement about a substantially horizontal axis, means for mounting an aircraft engine on said base member with it axis of thrust in a plane spaced from and substantially parallel to said horizontal axis, means for affording angular movement of said engine about an axis transverse to said plane, means including a shaft rotatably mounted within said base member and passing through said engine mounting means along said transverse axis for turning said engine about said transverse axis.

2. In an aircraft capable of both horizontal and vertical flight an engine mounting and engine position adjusting structure as set forth in claim 1 wherein said shaft is provided with a universal joint therein adjacent said horizontal axis for affording bending of said shaft upon rotary movement of said engine about said horizontal axis.

3. In an aircraft capable of both horizontal and vertical flight an engine mounting and engine position adjusting structure as set forth in claim 1 wherein said engine is enclosed in a generally cylindrical elongated housing and said means for affording angular movement of said engine comprises a ring bearing assembly having a diameter of the order of that of said housing and mounted laterally of said housing and connecting said housing and said base member.

4. In an aircraft capable of both horizontal and vertical flight an engine mounting and engine position adjusting structure as set forth in claim 1 wherein said base member is cylindrical and conforms to the surface of the edge of the aircraft body and constitutes a portion of the surface thereof.

5. In an aircraft capable of both horizontal and vertical flight, an engine mounting and engine position adjusting structure as set forth in claim 2 wherein said base member is cylindrical and comprises axial pivots mounting the member for rotation within the aircraft body and wherein said base member is provided with an elongated opening for passage of said shaft and for affording relative lateral movement of said shaft and said base member.

6. In an aircraft capable of both horizontal and vertical flight, an engine mounting and engine position adjusting structure as set forth in claim 3 wherein said base member is a hollow cylindrical body and including a smooth generally cylindrical housing connecting said member and said bearing ring and a second similar housing portion connecting said engine housing and said ring bearing assembly, said connecting housing portions having substantially the same diameter as said ring assembly and presenting a smooth continuous surface.

References Cited

UNITED STATES PATENTS

| | | | |
|---|---|---|---|
| 2,961,189 | 11/1960 | Doak | 244—12A |
| 2,972,898 | 2/1961 | Hartel | 244—43 |
| 3,096,949 | 12/1967 | Harrison | 244—42 |
| 3,096,952 | 7/1963 | Roppel | 244—12A |

MILTON BUCHLER, Primary Examiner

S. W. WEINRIEB, Assistant Examiner

U.S. Cl. X.R.

244—54, 56, 124